United States Patent
Oride et al.

(10) Patent No.: US 12,518,426 B2
(45) Date of Patent: Jan. 6, 2026

(54) IN-VEHICLE IMAGE PROCESSING DEVICE AND CALIBRATION METHOD OF THE SAME

(71) Applicant: Hitachi Astemo, Ltd., Hitachinaka (JP)

(72) Inventors: Hiroki Oride, Hitachinaka (JP); Noriaki Kimura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/856,029

(22) PCT Filed: Apr. 14, 2022

(86) PCT No.: PCT/JP2022/017796
§ 371 (c)(1),
(2) Date: Oct. 10, 2024

(87) PCT Pub. No.: WO2023/199465
PCT Pub. Date: Oct. 19, 2023

(65) Prior Publication Data
US 2025/0252601 A1 Aug. 7, 2025

(51) Int. Cl.
*H04N 7/18* (2006.01)
*G06T 7/80* (2017.01)
*G06V 20/56* (2022.01)

(52) U.S. Cl.
CPC ............... *G06T 7/80* (2017.01); *G06V 20/56* (2022.01)

(58) Field of Classification Search
CPC .................................... H04N 7/18; G06T 7/80
(Continued)

(56) References Cited

U.S. PATENT DOCUMENTS

| 8,395,693 B2 * | 3/2013 | Iijima | H04N 25/61 348/340 |
| 11,273,830 B2 * | 3/2022 | Shimizu | G06V 20/56 |

(Continued)

FOREIGN PATENT DOCUMENTS

JP 2014-052335 A 3/2014

OTHER PUBLICATIONS

International Search Report Issued in PCT Application No. PCT/JP2022/017796 dated Jul. 5, 2022, with English Translation.

*Primary Examiner* — Trang U Tran
(74) *Attorney, Agent, or Firm* — Foley & Lardner LLP

(57) ABSTRACT

The execution timing of calibration is optimized, and the stop period of an ADAS is suppressed. An in-vehicle image processing device that is mounted on a vehicle and processes an external image acquired by a camera, the in-vehicle image processing device includes a temperature sensor that detects a current temperature, a temperature prediction unit that predicts a future temperature based on time-series data of the temperature, a distance measurement error prediction unit that predicts a future distance measurement error based on a prediction of the temperature, a calibration timing determination unit that determines whether calibration using the image is executable based on vehicle operation information or external recognition information, and a calibration start determination unit that determines whether to start calibration using the image based on the current temperature or a remaining time in a case where the calibration timing determination unit determines that the calibration is executable during the remaining time until a time at which a distance measurement error predicted by the distance measurement error prediction unit is predicted to exceed a threshold.

6 Claims, 7 Drawing Sheets

(58) Field of Classification Search
USPC .................................................. 348/187, 148
See application file for complete search history.

(56) References Cited

U.S. PATENT DOCUMENTS

| | | | | |
|---|---|---|---|---|
| 11,450,029 | B2* | 9/2022 | Nakao | G06T 7/80 |
| 11,550,322 | B1* | 1/2023 | Christie | G05D 1/628 |
| 12,201,403 | B2* | 1/2025 | Rao | A61B 5/742 |
| 12,347,207 | B2* | 7/2025 | Kuraoka | G06V 10/762 |
| 2013/0088578 | A1* | 4/2013 | Umezawa | G06V 20/588 |
| | | | | 348/47 |

* cited by examiner

EXAMPLE OF TEMPERATURE TABLE

IN-VEHICLE IMAGE PROCESSING DEVICE AND CALIBRATION METHOD OF THE SAME

TECHNICAL FIELD

The present invention relates to an in-vehicle image processing device and a calibration method thereof used in an advanced driving assistance system.

BACKGROUND ART

Some vehicles equipped with the advanced driving assistance system (hereinafter, referred to as "ADAS") utilize a stereo camera as an external sensor for recognizing the external environment of the vehicle. In this in-vehicle stereo camera, an internal temperature rises due to internal heat generation after activation, and a structure such as a lens, a substrate, and a housing is thermally deformed, so that an optical axis shift of the lens occurs with the thermal deformation.

In recent in-vehicle stereo cameras, downsizing of imaging elements represented by CMOS image sensors has progressed, and the size of an imaging element per pixel has also been reduced. Therefore, even a slight optical axis shift due to a slight temperature change may deteriorate captured images, and may greatly affect parallax images generated from left and right images synchronously captured by the left and right cameras. Then, in that case, a large error also occurs in distance measurement calculation of the external environment of the vehicle, and there is a possibility that vehicle control by the ADAS is also adversely affected in the end.

Therefore, in the conventional stereo camera, the generated optical axis shift is appropriately corrected by using the image processing technology by the stereo method. Note that the stereo method is a method of imaging a target detection object from different positions of viewpoints using two cameras and obtaining a distance to the target detection object by the principle of triangulation.

Here, in the abstract of PTL 1, "Accuracy of distance measurement to a target object by a small stereo camera is improved." is described as a task, and as a solution, "The temperature of a stereo camera is acquired, and a baseline length of a camera parameter is corrected according to the temperature. In one embodiment, a sensor module 110 in a camera head unit 100 includes a stereo sensor 101 and a thermistor 102. The SEEPROM 104 stores calibration data at the time of calibration, a baseline length $B_0$, and a temperature $T_0$ at that time. When the stereo camera is used, the CPU 130 in the image processing unit 120 acquires calibration data, a baseline length $B_0$, and a temperature $T_0$ from the SEEPROM 104, and acquires a current temperature $T_R$ as an output value of the thermistor 102. The CPU 130 sets the calibration data in the correction circuit 122 as it is, but corrects the baseline length $B_0$ to the baseline length BR corresponding to $T_R$ and sets the same in the distance measurement circuit 123". As described above, in PTL 1, the temperature of the stereo camera is acquired, and the baseline length, which is a kind of optical system parameter, is corrected according to the temperature.

Since the internal temperature of the stereo camera fluctuates greatly immediately after the start of the vehicle (that is, immediately after activation of the stereo camera), optical shift due to thermal deformation of the structure is likely to occur. In addition, since the change in the internal temperature of the stereo camera is also affected by the external environment such as the temperature in the vehicle interior and does not always tend to change uniformly every time, it is not possible to uniformly schedule the calibration execution timing for suppressing the distance measurement error to a predetermined amount or less. Therefore, in PTL 1, as described in paragraph 0048 and the like, the baseline length, which is a kind of optical system parameter, is updated as needed based on the periodically measured temperature in the camera head unit.

CITATION LIST

Patent Literature

PTL 1: JP 2014-52335 A

SUMMARY OF INVENTION

Technical Problem

As in PTL 1, in a case where a baseline length capable of predicting a variation with respect to a temperature change is set as a calibration target, the baseline length can be calculated based on the measured temperature, and thus it is not necessary to stop the ADAS during calibration.

However, since the above-described optical axis shift has a complicated variation with respect to a temperature change, in a case where the optical axis shift is to be calibrated, it is necessary to perform precise calibration using an image processing technology at an appropriate timing, and there is a problem that the ADAS cannot be used during the calibration.

Therefore, an object of the present invention is to provide an in-vehicle image processing device and a calibration method thereof capable of suppressing a stop period of an ADAS by optimizing the execution timing of calibration using an image processing technology.

Solution to Problem

In order to solve the above problems, according to the present invention, there is provided an in-vehicle image processing device that is mounted on a vehicle and processes an external image acquired by a camera, the in-vehicle image processing device including: a temperature sensor that detects a current temperature; a temperature prediction unit that predicts a future temperature based on time-series data of the temperature; a distance measurement error prediction unit that predicts a future distance measurement error based on a prediction of the temperature; a calibration timing determination unit that determines whether calibration using the image is executable based on vehicle operation information or external recognition information; and a calibration start determination unit that determines whether to start calibration using the image based on the current temperature or a remaining time in a case where the calibration timing determination unit determines that the calibration is executable during the remaining time until a time at which a distance measurement error predicted by the distance measurement error prediction unit is predicted to exceed a threshold.

Advantageous Effects of Invention

According to the in-vehicle image processing device and the calibration method of the in-vehicle image processing device of the present invention, the stop period of the ADAS can be suppressed by optimizing the execution timing of the calibration using the image processing technology.

DESCRIPTION OF EMBODIMENTS

Hereinafter, embodiments of an in-vehicle image processing device and a calibration method thereof of the present invention will be described with reference to the drawings.

First Embodiment

First, with reference to FIGS. 1 to 3, an optical axis shift generated an in-vehicle stereo camera 100 will be described.

Figure 1:
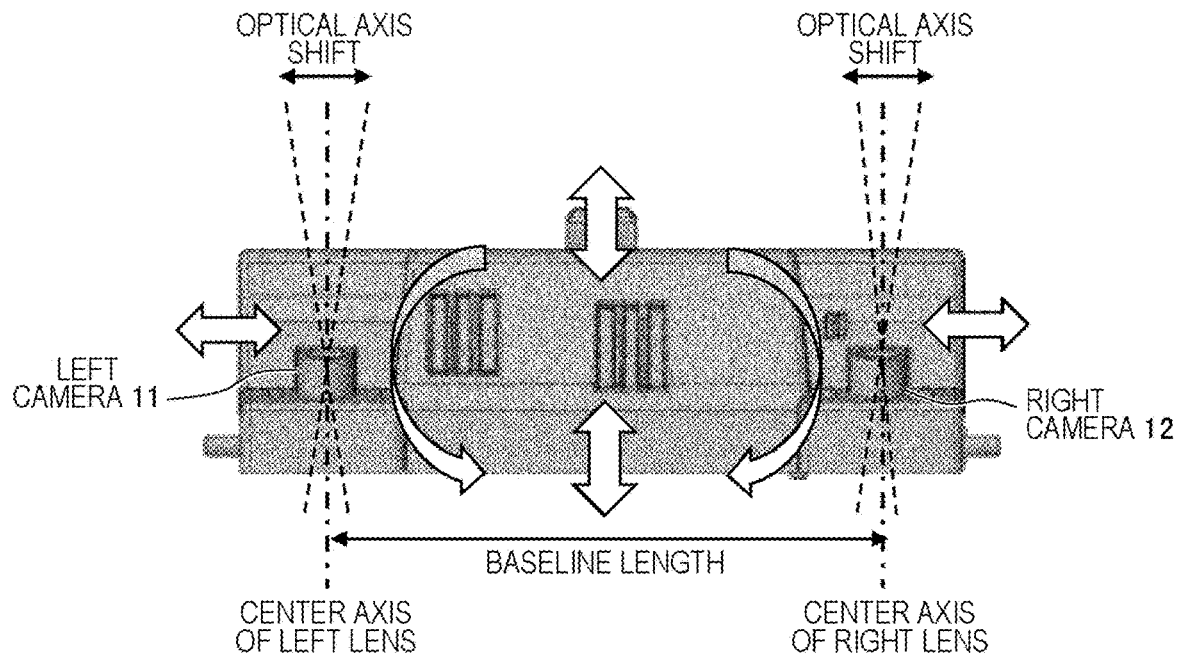
FIG. 1 is a plan view of an in-vehicle stereo camera as viewed from above.

FIG. 1 is a plan view of the in-vehicle stereo camera 100 incorporating a left camera 11 and a right camera 12 as viewed from above, and two vertical alternate long and short dash lines on the left and right indicate lens center axes of the left and right cameras. Further, two pairs of right and left broken lines exemplify a range of the optical axis shift of the left and right cameras.

When the driver starts the engine of the vehicle or the like, various circuits in the in-vehicle stereo camera 100 are energized to generate heat, and the camera internal temperature gradually rises. As the camera internal temperature rises, an optical axis shift occurs in which the optical axes of the left and right cameras deviate from the original lens central axes.

Figure 2:
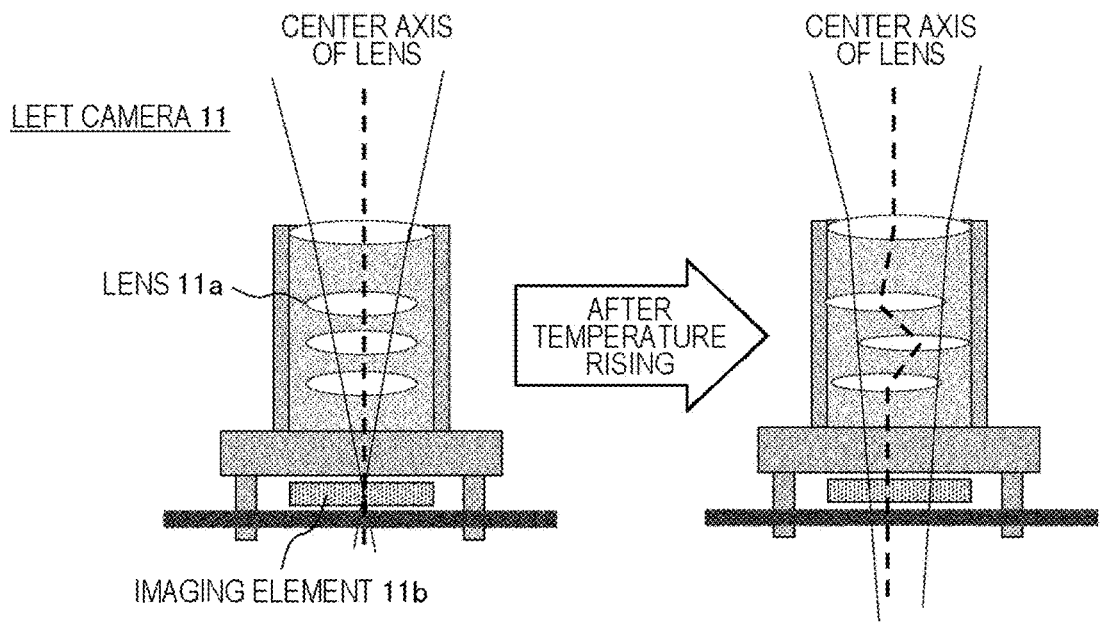
FIG. 2 is a diagram illustrating one cause of optical axis shift in a left camera in FIG. 1.

FIG. 2 is a diagram illustrating one factor of the optical axis shift of the left camera 11 in FIG. 1. As illustrated herein, when the internal temperature of the in-vehicle stereo camera 100 rises, each of a plurality of lenses 11a built in the left camera 11 deviates from the reference position, the lens central axis of the optical system is also deformed, and the optical axis shift occurs. Since this optical axis shift corresponds to a shift of the lens central axis position on an imaging element 11b, the image quality of the image captured after the occurrence of the optical axis shift is deteriorated as compared with the image captured under a situation where there is no optical axis shift. Note that the cause of occurrence of the optical axis shift is not limited to the example of FIG. 2, and for example, as illustrated in FIG. 1, expansion or twisting of the camera housing due to an increase in the temperature of the camera housing, and a change in the baseline length can also cause the optical axis shift.

Figure 3:
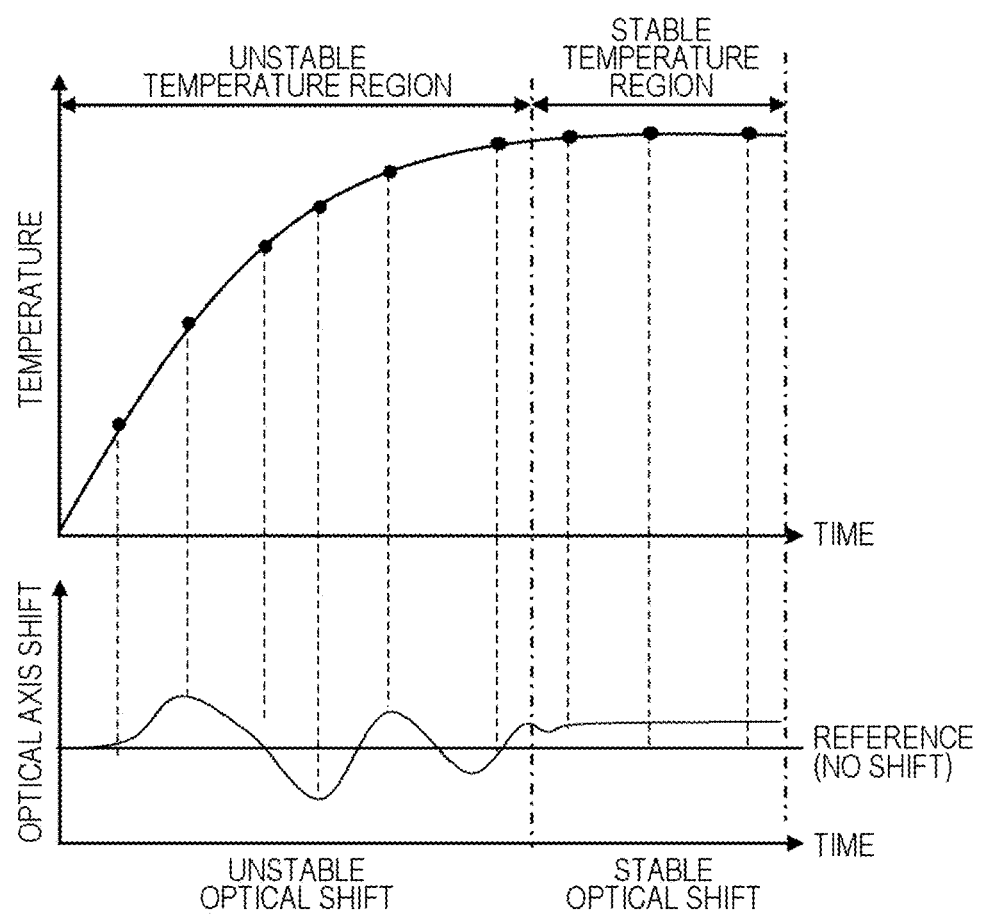
FIG. 3 is a graph illustrating optical axis shift in each temperature region.

FIG. 3 exemplifies the relationship between the temporal change in the temperature in the camera after activation of the in-vehicle stereo camera 100 and the temporal change in the optical axis shift. As illustrated in the upper graph, in the unstable temperature region immediately after the activation of the in-vehicle stereo camera 100, the expansion and twisting of the camera housing (see FIG. 1) and the central axis of the lens (see FIG. 2) change from moment to moment. Therefore, as illustrated in the lower graph, the optical axis shift greatly fluctuates up and down with the lapse of time. On the other hand, in the stable temperature region after a lapse of a predetermined time from the camera activation (for example, after a lapse of 30 minutes), since the temperature in the camera is stable, the expansion and twisting of the housing, the change in the lens central axis also converge, and the optical axis shift is also stable by a predetermined amount.

As can be seen from FIG. 3, an appropriate interval for calibrating the optical axis shift is different between the unstable temperature region where the optical axis shift is unstable and the stable temperature region where the optical axis shift is stable. Based on the above description, details of an in-vehicle image processing device 1 of the present embodiment will be described.

<In-Vehicle Image Processing Device 1>

Figure 4:
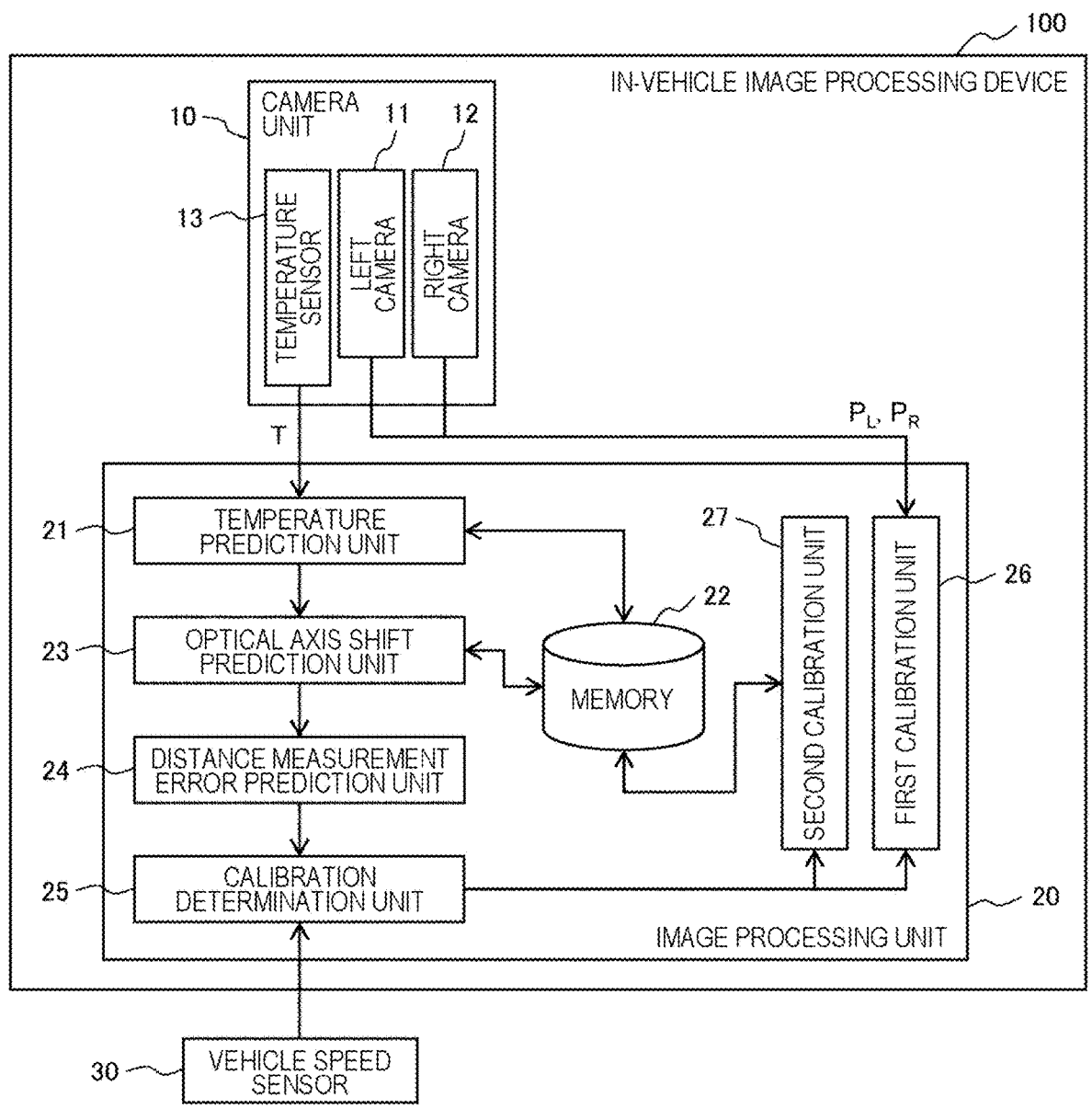
FIG. 4 is a functional block diagram of an in-vehicle image processing device according to a first embodiment.

FIG. 4 is a functional block diagram illustrating an example of an overall configuration of the in-vehicle image processing device 1 according to the present embodiment. As illustrated herein, the in-vehicle image processing device 1 includes a camera unit 10 and an image processing unit 20, and is connected to a vehicle speed sensor 30. Each unit will be sequentially described.

«Camera Unit 10»

The camera unit 10 is a stereo camera including a left camera 11 that is arranged on the left side of the camera housing and captures left image data $P_L$, a right camera 12 that is arranged on the right side of the camera housing and captures right image data $P_R$, and a temperature sensor 13 that measures a temperature in the camera housing and outputs temperature data T. It is assumed that the imaging ranges of the left image data $P_L$ and the right image data $P_R$ at least partially overlap, and the parallax image can be generated using the left and right images.

«Image Processing Unit 20»

The image processing unit 20 includes a temperature prediction unit 21, a memory 22, an optical axis shift prediction unit 23, a distance measurement error prediction unit 24, a calibration determination unit 25, a first calibration unit 26, and a second calibration unit 27. Specifically, the image processing unit 20 is a computer including an arithmetic device such as a CPU, a storage device such as a semiconductor memory, and hardware such as a communication device. Then, the arithmetic device executes a predetermined program to realize each functional unit such as the temperature prediction unit 21, but hereinafter, details of each unit will be described while appropriately omitting such a well-known technique.

The temperature prediction unit 21 calculates the gradient of the temperature in the camera using the time-series temperature data T sequentially acquired from the temperature sensor 13, and obtains the current rate of change and rate of increase in the temperature in the camera.

Figure 5:
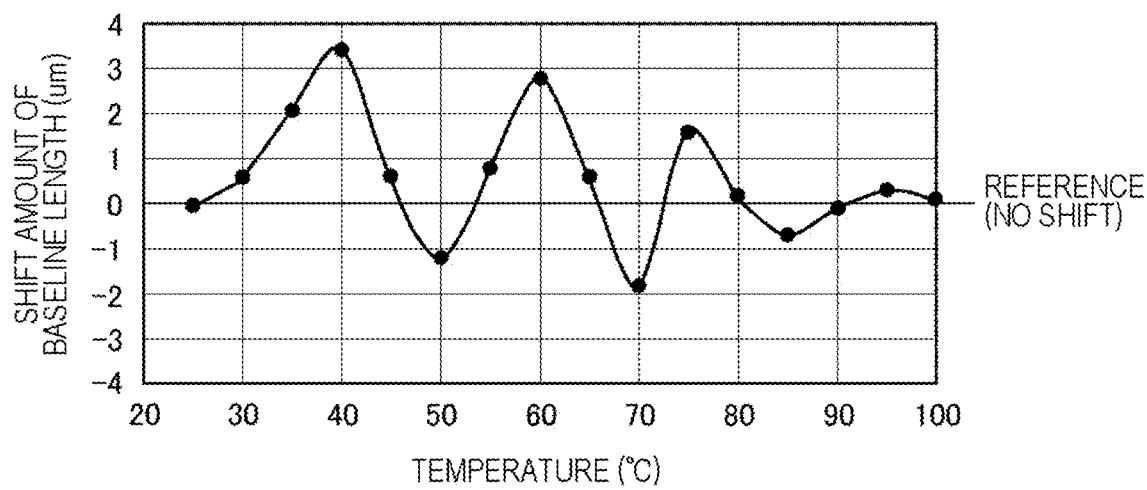
FIG. 5 is an example of a database stored in a memory.

The memory 22 stores a database indicating how optical system parameters such as a baseline length and left and right lens central axes change with respect to a temperature change. Note that FIG. 5 is an example of a temperature table in which the relationship between the shift amount of the baseline length and the temperature in the camera housing is recorded.

The optical axis shift prediction unit 23 collates the temperature gradient calculated by the temperature prediction unit 21 with the database of the memory 22, and predicts a future optical axis shift curve (optical axis shift with respect to time).

The distance measurement error prediction unit 24 converts the optical axis shift predicted by the optical axis shift prediction unit 23 into a distance measurement error, and predicts a future distance measurement error curve (distance measurement error with respect to time).

Figure 6:
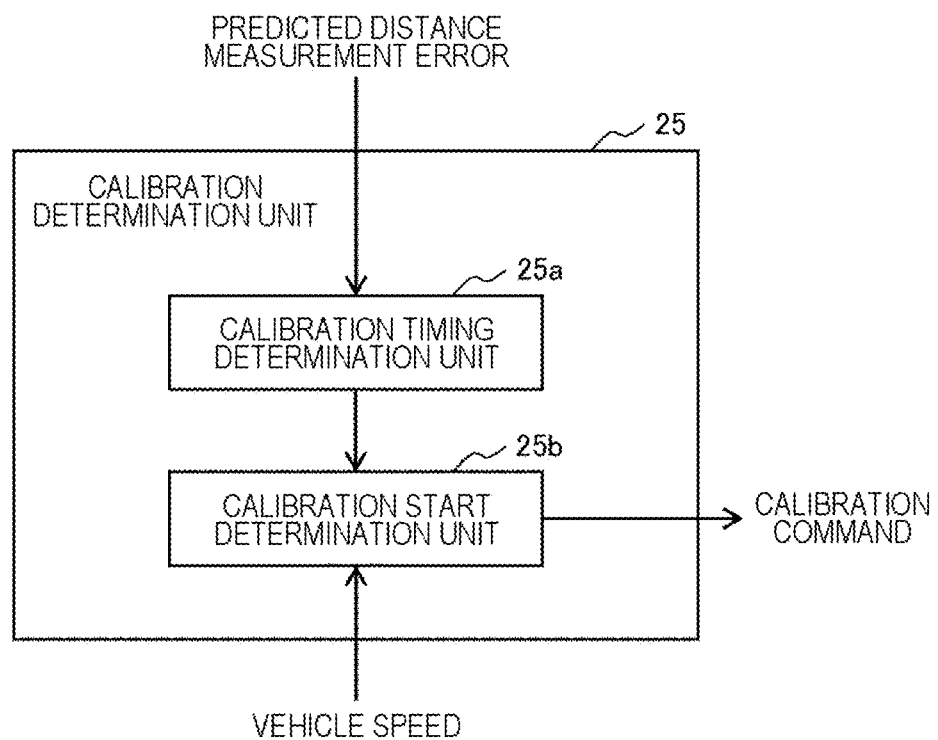
FIG. 6 is a detailed configuration diagram of a calibration determination unit in FIG. 4.

As illustrated in FIG. 6, the calibration determination unit 25 includes a calibration timing determination unit 25a and a calibration start determination unit 25b.

The calibration timing determination unit 25a determines appropriate timing for calibrating the optical axis shift by image processing based on the distance measurement error curve acquired from the distance measurement error prediction unit 24. For example, in a case where it is predicted that the time at which the distance measurement error exceeds the allowable distance measurement error is 3 minutes later, the calibration is scheduled to be performed within a remaining time (that is, 1 minute after 2 and 3 minutes from the present) of 1 minute immediately before the prediction. As a result, calibration can be performed before the distance measurement error exceeds the allowable range. Note that an advantage of performing calibration immediately before a timing at which an unacceptable distance measurement error is predicted to be exceeded is to reduce the number of stoppages of the ADAS as much as possible and shorten the stop period of the ADAS as much as possible by making a period during which calibration is not performed as long as possible.

The calibration start determination unit 25b instructs the first calibration unit 26 or the second calibration unit 27 to start calibration based on the calibration timing determined by the calibration timing determination unit 25a and the vehicle speed information acquired from the vehicle speed sensor 30. Note that details of the processing here will be described later with reference to FIG. 7.

The first calibration unit 26 performs precise optical axis shift correction using image processing by the stereo method the timing specified by the calibration determination unit 25.

The second calibration unit 27 performs simple optical axis shift correction using prediction calculation at the timing designated by the calibration determination unit 25.

The processing result of the first calibration unit 26 or the second calibration unit 27 is accumulated in the memory 22, and distance measurement calculation of the external environment of the vehicle is performed using the latest processing result. As a result, environment recognition based on the latest optical system parameters is performed, so that appropriate ADAS operation can be continued. Note that the processing results of a plurality of times accumulated in the memory 22 may be averaged and used for distance measurement calculation of the environment outside the vehicle.

<Flowchart of Calibration Processing According to Present Embodiment>

Figure 7:
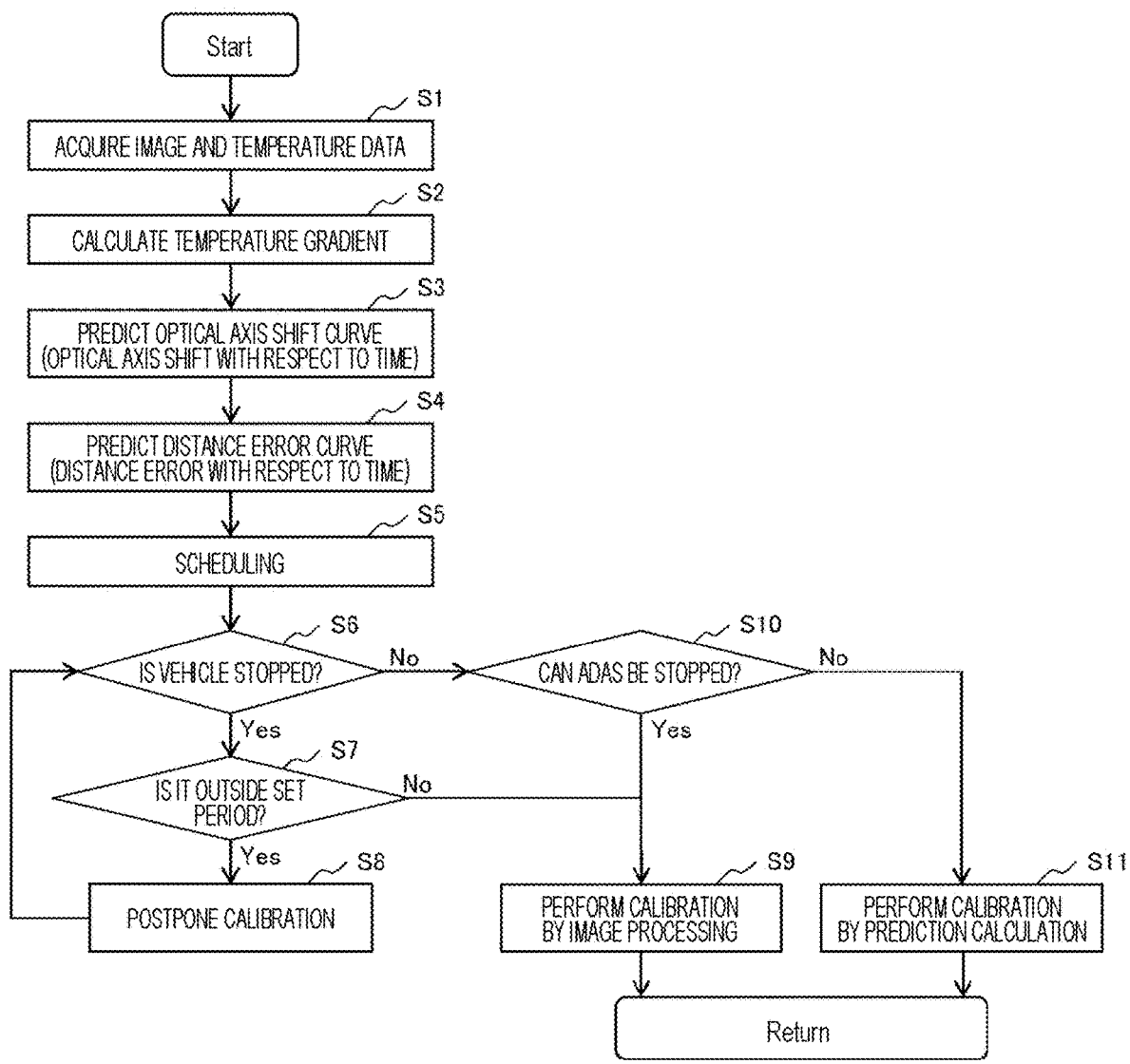
FIG. 7 is a processing flowchart of the in-vehicle image processing device according to the first embodiment.

Here, the calibration processing according to the present embodiment will be described with reference to the flowchart of FIG. 7.

First, in step S1, the image processing unit 20 acquires the left image data $P_L$ from the left camera 11, the right image data $P_R$ from the right camera 12, and the temperature data T from the temperature sensor 13. Although not illustrated in FIG. 1, various data acquired in this step are temporarily stored in the memory 22.

In step S2, the temperature prediction unit 21 calculates the temperature gradient of the temperature in the camera based on the time-series temperature data T stored in the memory 22.

In step S3, the optical axis shift prediction unit 23 refers to the temperature gradient calculated in step S2 and the database acquired from the memory 22 to predict the optical axis shift curve representing the optical axis shift amount with respect to the temporal change.

In step S4, the distance measurement error prediction unit 24 predicts a distance measurement error curve representing a distance measurement error shift amount with respect to a temporal change based on the optical axis shift curve predicted in step S3.

In step S5, the calibration determination unit 25 determines an appropriate timing for calibrating the optical axis shift based on the distance measurement error curve predicted in step S4. Note that, according to the above example, the appropriate timing is one minute after 2 minutes to 3 minutes from the current time.

In step S6, the calibration determination unit 25 determines whether the vehicle is stopped. Then, if the vehicle is stopped, the process proceeds to step S7, and if not (if the vehicle is traveling), the process proceeds to step S10. When it is determined whether the vehicle is stopped, vehicle speed information acquired from the vehicle speed sensor 30 may be used, or information such as an engine speed useful for estimating whether the vehicle is stopped may be used.

Note that the reason for providing this step (stop determination) is to perform calibration by image processing as soon as possible in consideration of the risk of an accident due to the stop of the ADAS because the ADAS function needs to be stopped when the first calibration unit 26 performs precise calibration by image processing.

In step S7, the calibration determination unit 25 determines whether the stop timing is outside the calibration period set in step S5. Then, if it is outside the set period, the process proceeds to step S8, and if not (if it is within the set period), the process proceeds to step S9.

For example, in a case where the timing of calibration by the first calibration unit 26 is set to 1 minute, which is 3 minutes after 2 minutes based on the timing setting time, it is determined that calibration is impossible if the stop timing is after 1 minute and 30 seconds, and the process proceeds to step S8. On the other hand, if the stop timing is after 2 minutes and 30 seconds, it is determined that calibration is possible, and the process proceeds to step S9.

In step S8, the calibration determination unit 25 does not issue the calibration command during the current stop. As a result, the calibration is postponed. Since the process returns to step S6 after step S8, the determination of step S7 is performed again at the next stop timing.

In step S9, the calibration determination unit 25 instructs the first calibration unit 26 to perform calibration of optical axis shift by image processing. As described above, it is necessary to stop the ADAS during the precise calibration of the optical axis shift by the image processing. However, in a case where the present step is reached through steps S6 and S7, the vehicle is stopped. Therefore, there is no disadvantage in safety even if the calibration is performed by stopping the ADAS.

In step S10, the calibration determination unit 25 determines whether the ADAS can be stopped even while the vehicle is traveling. Then, in a case where the ADAS can be stopped, the process proceeds to step S9, and if not (if the ADAS cannot be stopped), the process proceeds to step S11. For example, in a case where the host vehicle is driving slowly and there is no detection object within 5 meters in front of the host vehicle, it is considered that a safety disadvantage is small even if the ADAS is stopped for a while. Therefore, in step S9, the first calibration unit 26 is activated to perform precise calibration of optical axis shift by image processing.

Here, details of the determination in step S10 will be described with reference to FIGS. 8 and 9. As a calibration method, there is a technique called an automatic adjustment (calibration during traveling) method using feature point detection of an object.

Figure 8:
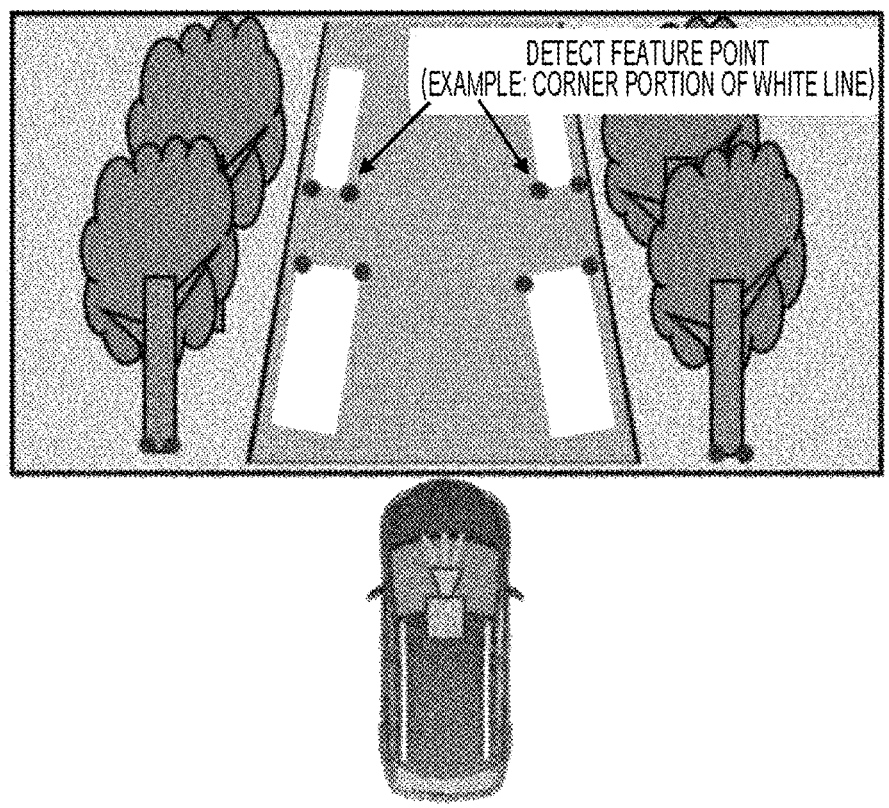
FIG. 8 is an example of a method of detecting a feature point in image data.
Figure 9:
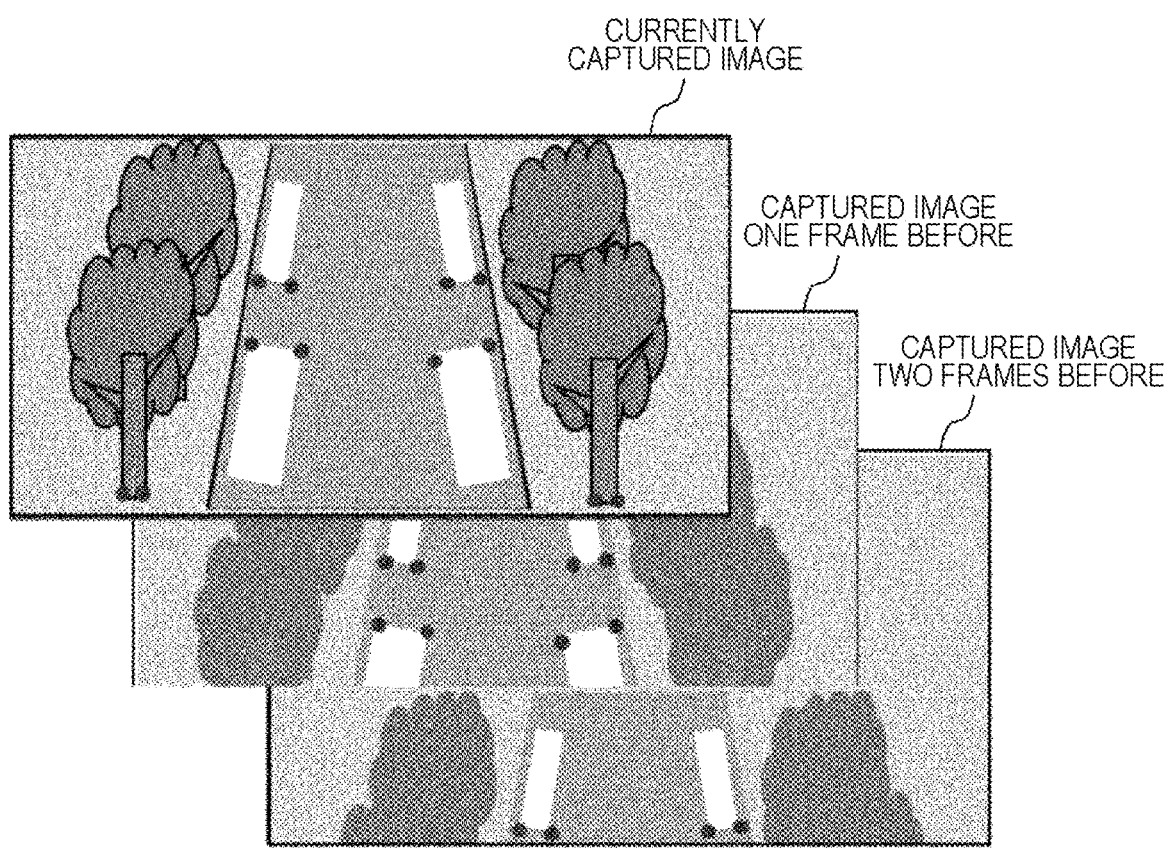
FIG. 9 is an example of a method of tracking a feature point in image data.

In this method, first, as illustrated in FIG. 8, a feature point (such as a corner portion having a large luminance difference) of a stationary object such as a sign, a road shoulder, or a white line is detected based on luminance information of each pixel. Then, as illustrated in FIG. 9, the detected feature point is tracked until the feature point information is lost (a moving object such as a vehicle is detected but not tracked), and the feature point coordinate information, the parallax information, and the like are stored as time-series information. The amount of change in the amount of movement of the host vehicle and the distance to the feature point ahead is calculated based on the acquired time-series information, and the parallax deviation is calculated to determine the correction amount.

In a case where it is determined that there is no problem even if the camera is stopped in the traveling state of the host vehicle by using the feature point detection of the object in the automatic adjustment, the mode is instantaneously switched from the automatic adjustment to the calibration by the image processing according to the calibration timing determined by the calibration determination unit 25 and the remaining time, and the processing of step S9 is performed.

For example, in a case where the safe state of the vehicle has been secured and the processing load factor of the object detection system is 20% or less (conditions such as the host vehicle is moving in parallel, the steering angle is not turned, the host vehicle travels straight, and there is no three-dimensional object that can be detected ahead are satisfied), it is determined that there is no problem even if the camera is stopped, and it is determined that calibration by image processing (step S9) can be performed.

In step S11, the calibration determination unit 25 instructs the second calibration unit 27 to perform simple calibration of optical axis shift by prediction calculation using the database registered in the memory 22. For example, even in a case where the vehicle cannot stop within the calibration period set in step S5 and the ADAS cannot be stopped as in traveling on an expressway, the optical axis shift caused by the temperature change in the camera housing progresses immediately after the activation of the in-vehicle stereo camera 100. Therefore, in such a case, although the correction accuracy is inferior to the precise calibration by the image processing, the calibration of the optical axis shift by the prediction calculation capable of obtaining a certain degree of correction accuracy is performed.

Note that since the calibration in this step is inferior in correction accuracy to the calibration in step S9, it is desirable to set a predetermined limit (for example, up to two consecutive times) on the number of times of continuous execution of the calibration in this step.

In the present embodiment, the temperature characteristic is described as the main factor causing the optical axis shift, but strictly, other factors such as manufacturing variation, aging, and camera mounting error are also considered. For this reason, since there is a possibility of affecting the optical axis shift depending on the state of the vehicle (use for long period after shipment, etc.), it is also possible to perform calibration by image processing immediately after the camera is activated and to remove these errors in advance until the optical axis shift due to the temperature change occurs.

As described above, in the present embodiment, it is possible to cope with various temperature changes by grasping the future optical axis shift. For example, it is also possible to reduce the number of times of local calibration due to a rapid temperature change, or conversely, when the temperature is stable. This makes it possible to perform calibration at an optimum timing while considering the travel environment of the vehicle. In addition, the generated distance measurement error can be managed so as not to exceed a threshold, and the minimum number of times is required, which can contribute to resource saving of the CPU.

According to the in-vehicle image processing device of the present embodiment described above, it is possible to suppress the stop period of the ADAS by optimizing the execution timing of the calibration using the image processing technology.

Second Embodiment

Next, a second embodiment of the present invention will be described. Redundant description of common points with the first embodiment will be omitted.

In the present embodiment, the determination content in the remaining time of the stop timing shown in the first embodiment will be replaced with a temperature change. The determination is made based on how many % the current temperature acquired from the temperature sensor 13 has changed from the temperature acquired last time.

For example, in a case where the vehicle stops within a set remaining time from the timing of performing calibration and a temperature change rate of 3% or more is set as the calibration implementable range, if the change rate of the current temperature from the previously acquired temperature is 5%, it is determined that calibration is possible (5%≥3%). The previously acquired temperature information is stored in the memory 22.

In addition, in a case where it is determined that calibration is impossible based on the temperature change rate, the timing of calibration is delayed by one time as in the operation described in the first embodiment, the process waits until the next stop timing, and the process is similarly repeated from the determination of the traveling state of the vehicle by the vehicle speed sensor 30.

REFERENCE SIGNS LIST 100 in-vehicle stereo camera
1 in-vehicle image processing device
10 camera unit
11 left camera
11a lens
11b imaging element
12 right camera
13 temperature sensor
20 image processing unit
21 temperature prediction unit
22 memory
23 optical axis shift prediction unit
24 distance measurement error prediction unit
25 calibration determination unit
26 first calibration unit
27 second calibration unit
30 vehicle speed sensor

The invention claimed is:

1. An in-vehicle image processing device that is mounted on a vehicle and processes an external image acquired by a camera, the in-vehicle image processing device comprising:
   a temperature sensor that detects a current temperature;
   a temperature prediction unit that predicts a future temperature based on time-series data of the temperature;
   a distance measurement error prediction unit that predicts a future distance measurement error based on a prediction of the temperature;
   a calibration timing determination unit that determines whether calibration using the image is executable based on vehicle operation information or external recognition information; and
   a calibration start determination unit that determines whether to start calibration using the image based on the current temperature or a remaining time in a case where the calibration timing determination unit determines that the calibration is executable during the remaining time until a time at which a distance measurement error predicted by the distance measurement error prediction unit is predicted to exceed a threshold.

2. The in-vehicle image processing device according to claim 1, wherein
   in a case where it is not determined that calibration using the image is executable during the remaining time, calibration is executed based on the predicted distance measurement error.

3. The in-vehicle image processing device according to claim 2, wherein
   in a case where calibration based on the predicted distance measurement error is continuously executed a predetermined number of times or more, calibration using the image is executed regardless of determination by the calibration start determination unit.

4. The in-vehicle image processing device according to claim 1, wherein
   the calibration start determination unit determines whether to start calibration using the image based on the current temperature or the remaining time in a case where the calibration timing determination unit determines that the calibration is executable during a period from a time at which the distance measurement error predicted by the distance measurement error prediction unit is predicted to exceed a threshold to a predetermined time before.

5. The in-vehicle image processing device according to claim 1, wherein
   the vehicle operation information is a vehicle speed or an engine speed.

6. A calibration method for an in-vehicle image processing device that is mounted on a vehicle and processes an external image acquired by a camera, the calibration method comprising:
   a temperature prediction step of predicting a future temperature based on time-series data of a temperature detected by a temperature sensor;
   a distance measurement error prediction step of predicting a future distance measurement error based on prediction of the temperature;
   a calibration timing determination step of determining whether calibration using the image is executable based on vehicle operation information or external recognition information; and
   a calibration start determination step of determining whether to start calibration using the image based on a current temperature or a remaining time in a case where it is determined that the calibration is executable during the remaining time until a time at which a predicted distance measurement error is predicted to exceed a threshold.

* * * * *